(12) United States Patent
Ishii et al.

(10) Patent No.: US 7,490,765 B2
(45) Date of Patent: Feb. 17, 2009

(54) METHOD OF MANUFACTURING RATING LABEL, AND PROGRAM FOR MANUFACTURING RATING LABEL

(75) Inventors: Seiji Ishii, Kanagawa (JP); Yukio Kobayashi, Atsugi (JP); Takeshi Kikuchi, Suntou-gun (JP); Kohichi Hashimoto, Ashigarakami-gun (JP)

(73) Assignee: Ricoh Company, Ltd., Tokyo (JP)

( * ) Notice: Subject to any disclaimer, the term of this patent is extended or adjusted under 35 U.S.C. 154(b) by 1304 days.

(21) Appl. No.: 10/429,852

(22) Filed: May 6, 2003

(65) Prior Publication Data

US 2003/0212468 A1    Nov. 13, 2003

(30) Foreign Application Priority Data

May 9, 2002  (JP)  ............................. 2002-133918

(51) Int. Cl.
    *G07B 15/02* (2006.01)
(52) U.S. Cl. ..................... 235/384; 235/375; 235/385; 283/81; 700/116
(58) Field of Classification Search ............... 235/384, 235/375, 435, 385; 700/116; 283/81
    See application file for complete search history.

(56) References Cited

U.S. PATENT DOCUMENTS

| | | | |
|---|---|---|---|
| 4,718,784 A | 1/1988 | Drisko | |
| 5,040,132 A | 8/1991 | Schuricht et al. | |
| 5,329,102 A * | 7/1994 | Sansone | ..................... 235/375 |
| 5,456,782 A | 10/1995 | Fujita et al. | |
| 5,621,864 A | 4/1997 | Benade et al. | |
| 5,783,288 A | 7/1998 | Fujita et al. | |
| 2002/0031386 A1 | 3/2002 | Allday | |

FOREIGN PATENT DOCUMENTS

| | | |
|---|---|---|
| EP | 0 442 684 | 8/1991 |
| JP | 59-152134 | 8/1984 |
| JP | 59-152134 A | 8/1984 |
| JP | 61-276297 | 12/1986 |
| JP | 61-276297 A | 12/1986 |

OTHER PUBLICATIONS

Office Action dated Mar. 11, 2008 directed to JP2002-133918.
English Translation of Japanese Office Action mailed on Mar. 11, 2008 directed towards foreign application No. 2002-133918; 2 pages.

* cited by examiner

*Primary Examiner*—Seung H Lee
(74) *Attorney, Agent, or Firm*—Morrison & Foerster LLP (57) ABSTRACT

A management computer 21 extracts product type information from a product type data storing unit 23 based on an input product type identifier, and receives information about a selected shipment destination. Then, the management computer 21 extracts a permission type from a shipment destination specification data storing unit 22 based on the product type and a shipment destination identifier. Further, the management computer 21 determines whether or not permission about the permission type has been obtained. When the permission has been obtained, the management computer 21 extracts a permission identifier. The management computer 21 extracts rating information of the product type data based on record items of the shipment destination specification data, and provides an instance format of the rating label.

15 Claims, 5 Drawing Sheets

METHOD OF MANUFACTURING RATING LABEL, AND PROGRAM FOR MANUFACTURING RATING LABEL

BACKGROUND OF THE INVENTION

1. Field of the Invention

The present invention relates to a rating label manufacturing method and a rating label manufacturing program.

2. Description of the Related Art

Rating labels are affixed to many industrial products such as electronics devices. This rating label is a label that shows rating information such as a rated voltage, and/or various permission marks. In some cases, a designer of a product individually determines the layout of the rating label, based on the rating information such as the rated voltage, and/or based on the permission mark. Meanwhile, items to be shown on the rating label, the rating information, and the permission mark are determined by respective governments or the like. Accordingly, even in the case of the same products, it is necessary to manufacture different labels in accordance with the destinations to which the products are shipped.

However, when a designer of a product individually determines layouts of rating labels that become different from each other depending on the shipment destinations, not only the layout determination takes time, but also the layouts of the rating labels are not standardized. Further, required times or periods for obtaining various permissions are different from each other, and there is a possibility that contents, conditions or the like of required permissions are changed. In such a case, in prompt response to this, a new rating label that shows required information needs to be manufactured.

SUMMARY OF THE INVENTION

It is an object of the present invention to provide a method of manufacturing a rating label having a necessary permission mark and rating information by which the above described problems are solved.

It is another object of the present invention to provide a program for manufacturing a rating label having a necessary permission mark and rating information by which the above-described problems are solved.

According to a first aspect of the present invention, there is provided a method of manufacturing a rating label by using shipment destination specification information storing means and a computer that controls the shipment destination specification information storing means, in which the shipment destination specification information storing means store permission types and rating label record items that are determined in accordance with respective shipment destinations and respective product types, the method comprising the steps of:

specifying a first product type based on a product type identifier input to the computer;

extracting a first permission type and one or more rating label record items from the shipment destination specification information storing means based on a first shipment destination of a first product input to the computer and based on the first product type; and setting a first layout of a first rating label based on the first permission type and the one or more rating label record items that are recorded on the first rating label format.

According a second aspect of the present invention, there is provided a program for manufacturing a rating label by using shipment destination specification information storing means and a computer that controls the shipment destination specification information storing means, in which the shipment destination specification information storing means stores permission types and rating label record items that are determined in accordance with respective shipment destinations and respective product types, the program comprising:

a product type specifying code for specifying a first product type based on a product type identifier input to the computer;

a rating label record item extracting code for extracting a first permission type and one or more rating-label record items from the shipment destination specification information storing means based on a first shipment destination of a first product input to the computer and based on the first product type; and a rating label layout setting code for setting a layout of a first rating label based on the first permission type and the one or more rating label record items that are recorded on the first rating label.

With the above method and/or program, it is possible to efficiently manufacture rating labels having necessary display items and a necessary permission mark.

Preferably, based on the first permission type and the one or more rating label record items, an operator is prompted to input information of whether or not permission about the first permission type has been obtained, and input contents of the one or more rating label record items. Furthermore, the layout of the first rating label is preferably set based on the input information of whether or not the permission about the first permission type has been obtained and based on the input contents of the one or more rating label record items. Accordingly, since an operator is prompted to input information necessary for the rating label, an operator can input the necessary information without omission.

In addition, the computer is preferably connected to product type information storing means that store product type information including permission information and rating information for each product type identifier (in this specification, the rating information means a rated-voltage vale, rated frequency value, and/or the like). Further, product type information related to the first permission type and the one or more rating label record items is preferably extracted from the product type information storing means. Furthermore, the first layout of the first rating label is preferably set based on the extracted product type information. Accordingly, since the computer extracts information necessary for the rating label from the product type information storing means, it is possible to efficiently set the layout of the rating label.

DETAILED DESCRIPTION OF THE PREFERRED EMBODIMENTS

One embodiment of the present invention will be described with reference to FIGS. 1 through 7. The following description of this embodiment of the present invention will be directed to a method of manufacturing rating labels that include record items that are determined for each shipment destination and each product. In addition, the following description of this embodiment of the present invention will be also directed to a program for manufacturing the rating labels.

Figure 1:
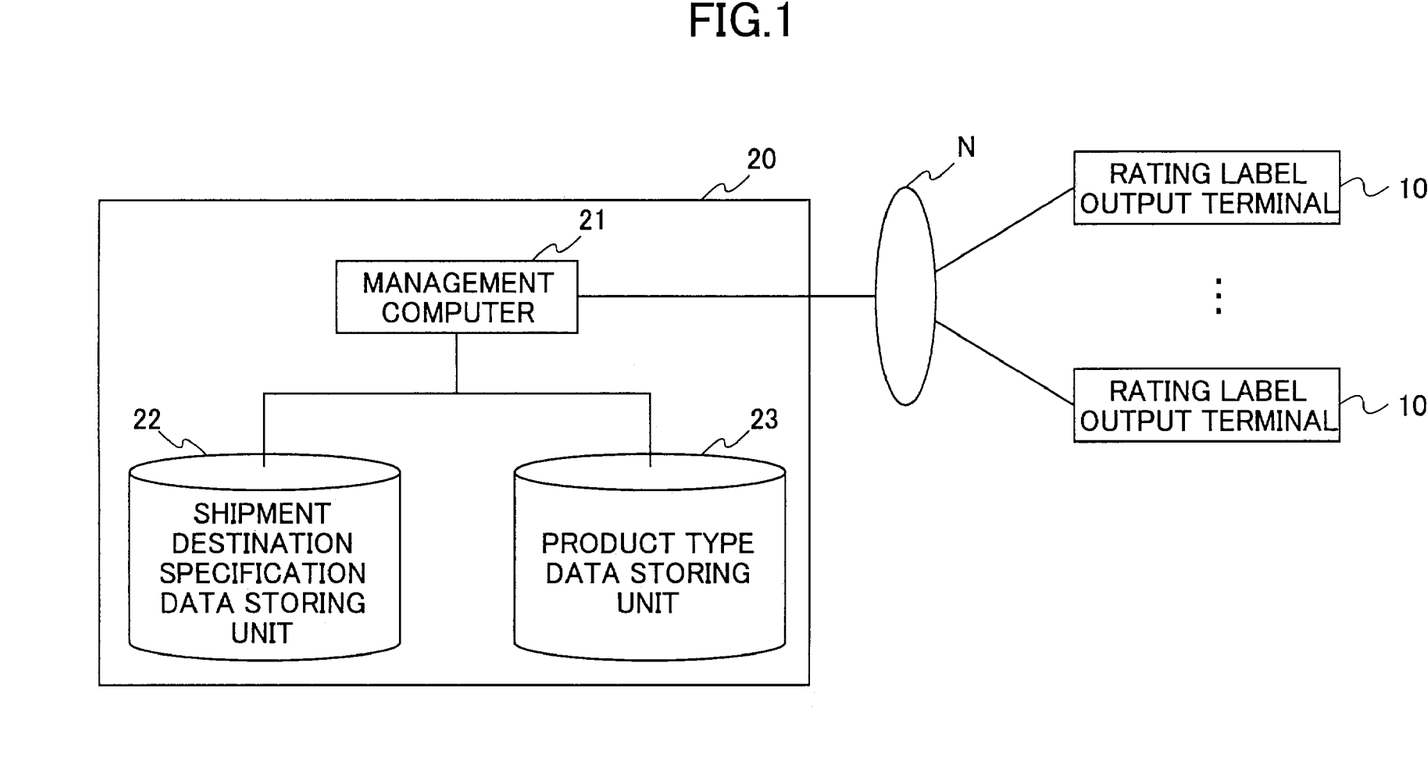
FIG. 1 is a schematic diagram of a system according to one embodiment of the present invention.

As shown in FIG. 1, a rating label manufacturing system 20 is connected to a rating label output terminal 10 via a network N.

The rating label output terminal 10 outputs a rating label, and includes printing means for printing rating labels. This rating label output terminal 10 receives rating label printing data that is transmitted from a management computer 21 of the rating label manufacturing system 20 (the rating label printing data may-include the rating label format on which the permission mark, the rating information, and the like are set). Based on the received rating label printing data, the rating label output terminal 10 performs printing of rating labels. In order to realize the above function, the rating label output terminal 10 includes control means (CPU) (not shown), storing means (for example, RAM, ROM, hard disk, and so on), display means (for example, a monitor), and input means.

As shown in FIG. 1, the rating label manufacturing system 20 includes the management computer 21. The management computer 21 is a computer that includes control means (CPU) (not shown), storing means (for example, RAM, ROM, hard disk, and so on), and communication means. The management computer 21 executes a rating label manufacturing program so as to perform a rating label manufacturing process. This rating label manufacturing program may include various-programs, and these various programs may be executed so that data reception/transmission, a data process described later, and the like can be performed. That is, according to this embodiment of the present invention, this management computer 21 functions as means for determining a product type, means for extracting items recorded on a rating label, and means for setting a layout of a rating label.

A shipment destination specification data storing unit 22 that is shipment destination specification data storing means is connected to the management computer 21. Further, a product type data storing unit 23 that is product type information storing-means is connected to the management computer 21.

Figure 2:
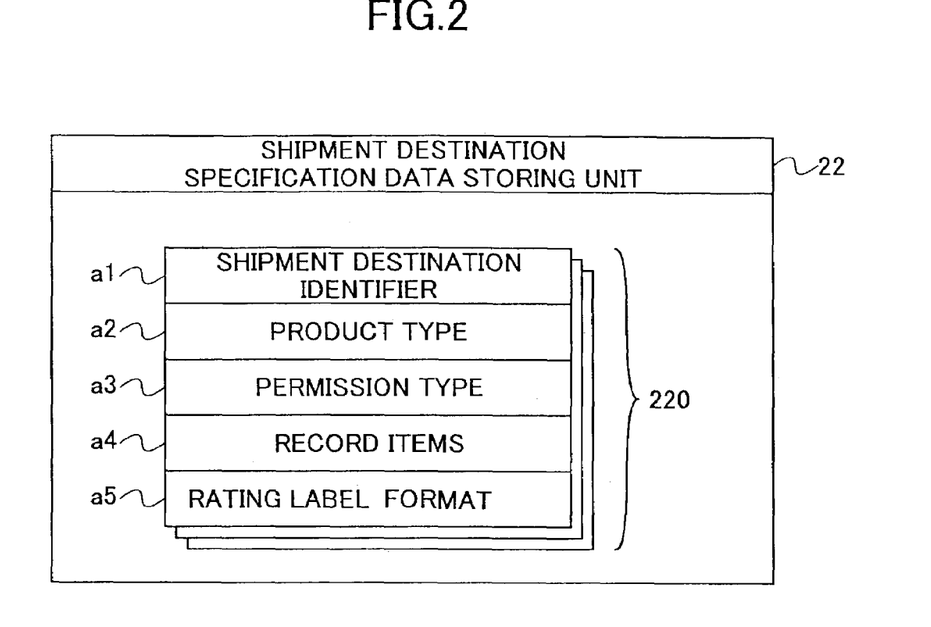
FIG. 2 is an illustration of data stored in a shipment destination specification data storing unit.

As shown in FIG. 2, shipment destination specification data 220 for each destination and each product type is stored in the shipment destination specification data storing unit 22. According to this embodiment, the shipment destination specification data 220 includes a shipment destination identifier a1, a product type a2, a permission type a3, a record items a4, and a rating label format (rating label format information) a5. The shipment destination identifier a1 is used for identifying a shipment destination. The product type a2 indicates a product type such as a computer and a facsimile machine. The permission type a3 indicates a predetermined permission type that is specified by the shipment destination identifier a1 and the product type a2. According to this embodiment, for example, when the shipment destination is Japan, the permission type a3 may be selected from "PSE" and "JATE". When the shipment destination is Japan, depending on the product type a2, there is a case where both "PSE" and "JATE" are required, a case where only "PSE" is required, or a case where only "JATE" is required. Furthermore, for example, when the shipment destination is North America, the permission type a3 may be "FCC", and when the shipment destination is Europe, the permission type a3 may be "Laser". The record items a4 indicates rating information that needs to be recorded on the rating label.

The rating label format a5 is information about a format of items that are printed on a rating label. For example, the rating label format a5 is information used for printing a rating label format 40 shown in FIG. 5. The rating label format 40 includes a permission number title 41, a rating information title 42, a product type code title 43, and a manufactured product number title 44. The rating information title 42 corresponds to the record items a4. The rating information title 42 includes a rated voltage, a rated frequency, a rated electric power consumption, and a rated electric current. The rating label format 40 includes a product name display 45, a permission mark display 46, a permission number display 47, a rating information display 48, a product type code display 49, a brand display 50, and an additional display 51. Furthermore, the rating label format 40 includes position information about a product number display 52 and a two dimensional bar code display 53. The rating information display 48 corresponds to the rating information title 42 that is shown on the rating label in accordance with the record items a4. Prior to the process of the embodiment according to the present invention, the shipment destination specification data 220 may be previously stored in the shipment destination specification data storing unit 22 based on the permission types and record items to be shown on the rating label for each state (country).

Figure 3:
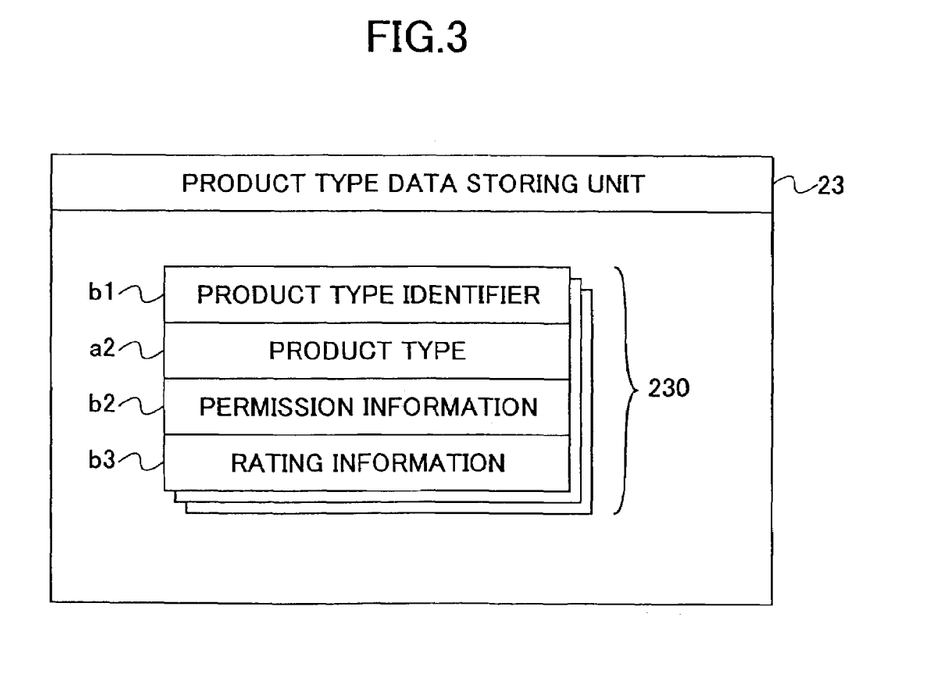
FIG. 3 is an illustration of data stored in a product type data storing unit.

As shown in FIG. 3, the product type data 230 corresponding to each product type identifier is stored in the product type data storing unit 23. According to the embodiment of the present invention, the product type data 230 includes the product type identifier b1, a product type a2 (product type information a2), permission information b2, and rating information b3. The product type identifier b1 is provided for identifying the product type. The product type information a2 indicates the product type of the shipment destination specification data 220. The permission information b2 is set so as to indicate the type of the permission that has been given to the product. For example, when the permissions about "PSE" and "JATE" are given to the product, "PSE" and "JATE" are set as the permission information b2 of the product. The rating information indicates the rating of the product. The rating information about the matters corresponding to the record items a4 of the shipment destination specification data 220 is set as the rating information b3. For example, the rated voltage, the rated frequency, the rated electric current, the rated electric power, and the like are set as the rating information b3. The product type data 230 may be stored in the product type data storing unit 23 at the time of the designing or when the permission is obtained.

Next, the process in which the management computer 21 manufactures rating labels in the above-configured system by using the rating label output terminal 10 will be described with reference to FIG. 4.

Figure 4:
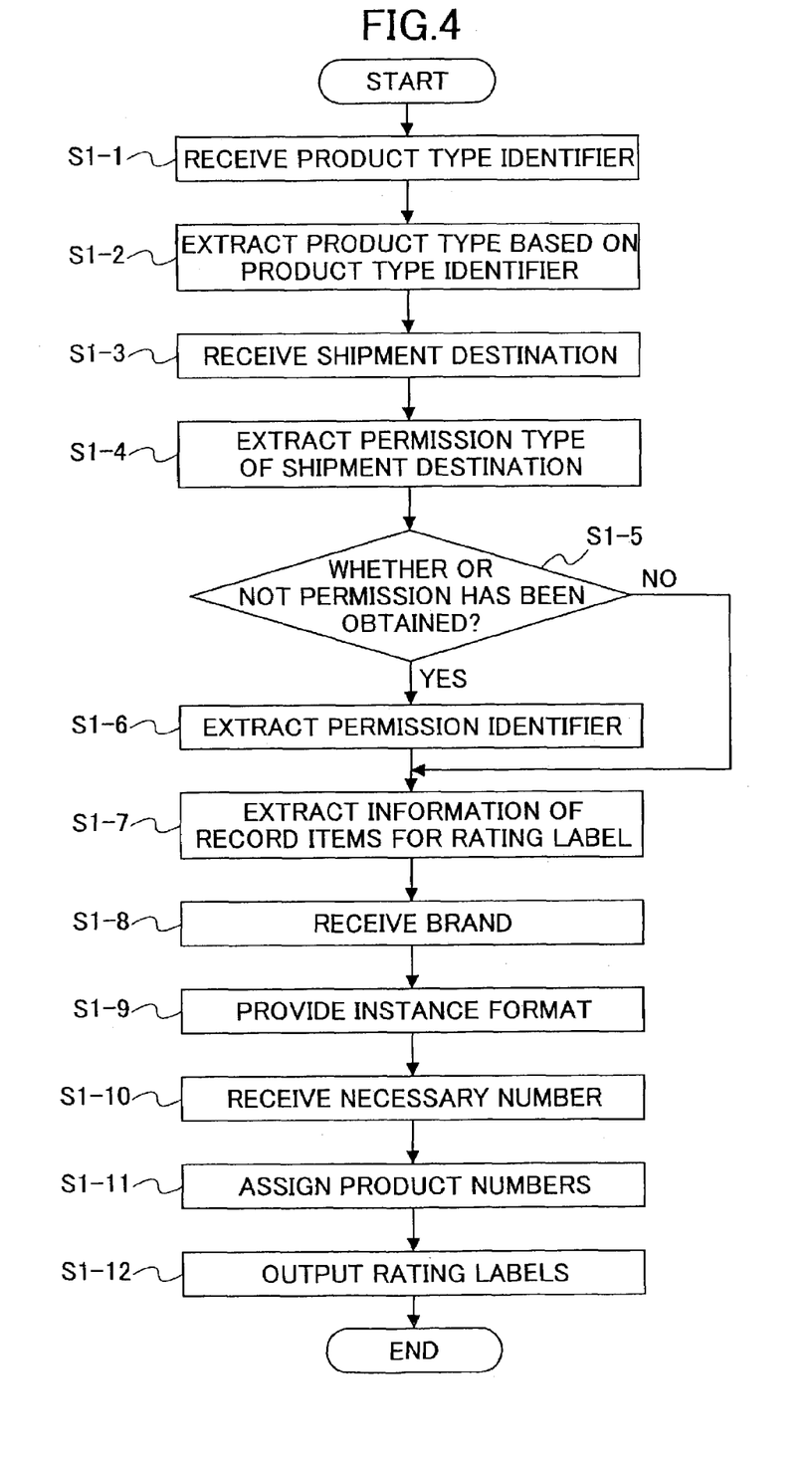
FIG. 4 shows a process procedure according the embodiment of the present invention.
Figure 5:
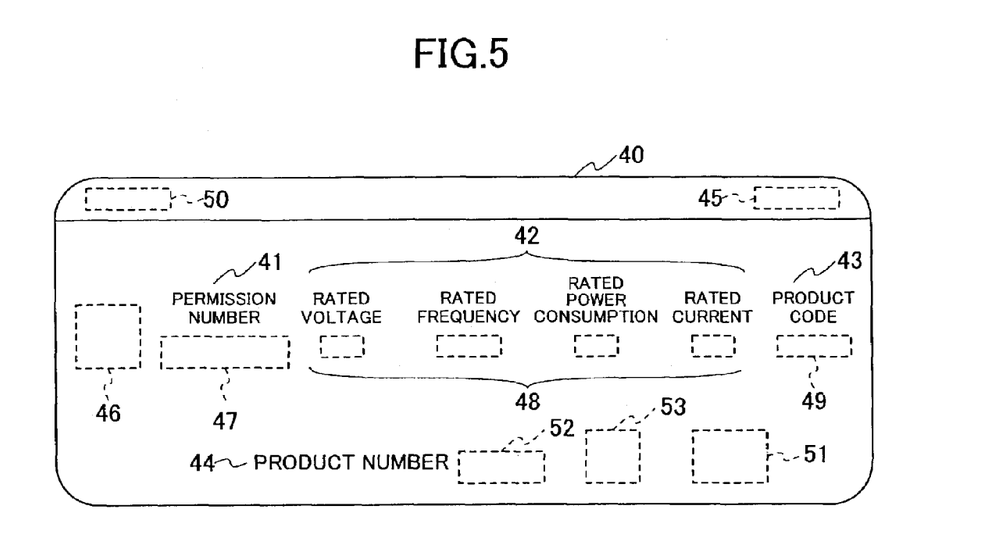
FIG. 5 is an illustration showing information printed on a rating label.

As shown in FIG. 4, first, an operator requests the manufacturing of rating labels by using the rating label output terminal 10. At this time, the rating label output terminal 10 transmits this rating label manufacturing request data to the management computer 21 via the network N. The management computer 21 that received this request transmits to the rating label output terminal 10 an input request that the product type identifier b1 of the product type of which rating label is to be manufactured should be input to the management computer 21. The rating label output terminal 10 that received this input request prompts an operator to input the product type identifier b1 to the rating label output terminal 10. As one example, in order to prompt an operator to input various data including the product type identifier b1, the request (prompting) for the input may be displayed on a monitor of the rating label output terminal 10. When an operator inputs to the rating label output terminal 10 the product type identifier b1 corresponding to the product type of which rating label is to be manufactured, the rating label output terminal 10 transmits the input product type identifier b1 to the management computer 21. The management computer 21 receives this product type identifier b1 via the network N in Step S1-1. Next, the management computer 21 extracts the product type a2 from the product type data storing unit 23 based on the received product type identifier b1 in Step S1-2.

Subsequently, the management computer 21 transmits a request for the shipment destination identifier a1 to the rating label output terminal 10. The rating label output terminal 10 prompts an operator to input the shipment destination identifier a1 to the rating label output terminal 10. When an operator inputs the shipment destination identifier a1 to the rating label output terminal 10, the rating label output terminal 10 transmits the input shipment destination identifier a1 to the management computer 21. Thus, the management computer 21 receives the shipment destination identifier a1 via the network N, and obtains the shipment destination data based on the received shipment destination identifier a1 in Step S1-3. Subsequently, the management computer 21 extracts the permission type a3 from the shipment destination specification data storing unit 22 based on the received shipment destination identifier a1 in Step S1-4.

Thereafter, the management computer 21 determines whether or not the permission about the permission type a3 has been obtained in Step S1-5. To be specific, the management computer 21 extracts the permission information b2 from the product type data storing unit 23 extracts the permission information b2 from the product type data storing unit 23 based on the product type identifier b1, and determines whether or not the permission about the permission type a3 has been obtained. For example, when the permission type a3 has been set in the permission information b2, the management computer 21 determines that the permission has been obtained. When the management computer 21 determines that the permission has been obtained (Yes in Step S1-5), the management computer 21 extracts the permission identifier in Step S1-6 In this example, the permission number assigned at the time the permission is obtained may be used as the permission identifier. According to this embodiment of the present invention, the permission identifier may be stored in a storing unit (not shown in the drawings) such that the permission identifier is related to the product type identifier b1 and the permission type a3.

Next, the management computer 21 extracts the item information corresponding to the record items a4 from the rating information b3 of the product type data 230 based on the record items a4 of the shipment destination specification data 220 in Step S1-7. That is, the management computer 21 extracts this item information from the product type data storing unit 23. This item information (i.e., the rating information) may be the information contents (such as a rated voltage value, rated frequency value, and/or the like) that are input in advance by an operator. Further, the information contents may be input by the operator via the rating label output terminal 10. Alternatively, the management computer 21 may prompt an operator to input the information contents (corresponding to the record items a4) to the management computer 21 via the rating label output terminal 10.

Subsequently, the management computer 21 transmits to the rating label output terminal 10 an in-put request that a brand to be recorded (shown) on the rating label should be input to the management computer 21. When an operator inputs a brand to the rating, label output terminal 10, the rating label output terminal 10 transmits the input brand to the management computer 21. Thus, the management computer 21 receives this input brand from the rating label output terminal 10 via the network N in Step S1-8.

Thereafter, the management computer 21 outputs an instance format of the rating label based on the shipment destination specification data 220, the product type data 230, and the input data in Step S1-9. To be specific, the management computer 21 generates the label format a5 (of the shipment destination specification data 220) on which the permission mark corresponding to the product type a2 (and the shipment destination), and the permission identifier corresponding to the product type a2, and the rating information b3 of the product type data 230, and the like are set. Then, the management computer 21 transmits to the rating label output terminal 10 rating label display data used for displaying thus-generated rating label format. The rating label output terminal 10 that received the rating label display data displays the rating label format on the monitor of the rating label output terminal 10.

Figure 6:
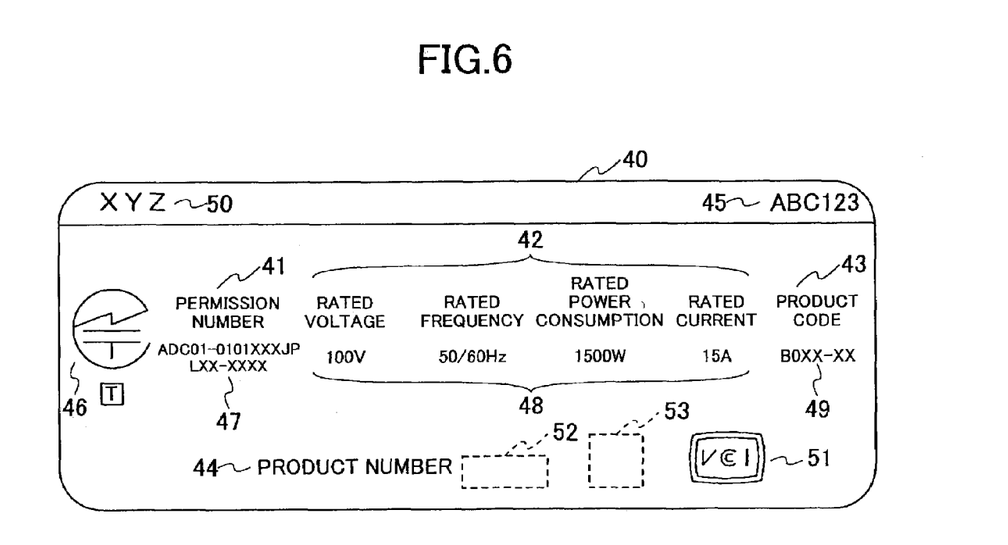
FIG. 6 is an illustration showing information printed on the rating label.

In this example, the rating label format 40 shown in FIG. 6 is displayed on the monitor of the rating label output terminal 10. At this stage, the rating label format 40 includes a product type name display 45, the permission mark display 46, the permission number display 47, the rating information display 48, the product type code display 49, the brand display 50, and the additional display 51. The product type name extracted from a storing unit (not shown) based on the product type identifier b1 of the product type data 230 is set as the product type name display 45. A permission mark and a permission number extracted based on the permission information b2 of the product type data 230 are set as the permission mark display 46 and the permission number display 47, respectively. The information corresponding to the rating information title 42 is set as the rating information display 48 based on the rating information b3 of the product type data 230. The information based on the product type identifier b1 of the product type data 230 is set as the product type code display 49.

An additional necessary permission mark extracted from a storing unit (not shown) based on the product type identifier b1 and the shipment destination identifier a1 may be set as the additional display 51. However, at this stage, the manufacturing number display 52 and the two-dimensional bar code display 53 are not recorded on the rating label format 40. When an operator confirms the items or information displayed on the monitor of the rating label output terminal 10, and intends to manufacture the rating label by using the displayed rating label format 40, the operator transmits from the rating label output terminal 10 to the management computer 21 an output request that the rating label should be output.

In response to this output request, the management computer 21 transmits to the rating label output terminal 10 an input request that the necessary number of the rating labels be input to the management computer 21. The rating label output terminal 10 that received this input request displays on the monitor of the rating label output terminal 10 an input image used when an operator inputs the necessary number of the rating labels. When the operator inputs the necessary number of the rating labels to the rating label output terminal 10 by using the input image displayed on the monitor, the rating label output terminal 10 transmits the input necessary number of the rating labels to the management computer 21. Then, the management computer 21 receives this necessary number of the rating labels via the network N in Step S1-10.

Next, the management computer 21 assigns the product numbers in accordance with the necessary number of the rating labels in Step S1-11. To be specific, the management computer 21 determines the start number to be assigned to the product based on the maximum number that has already been assigned to the product. This maximum number may be stored in a storing unit (not shown). The management computer 21 assigns the necessary product numbers to the products, respectively, from the start number, and then transmits to the rating label output terminal 10 rating label printing data used for printing the rating labels. This rating label printing data is the rating label format that was displayed on the monitor in Step S1-9, but that includes the assigned product numbers. Thereafter, the rating label output terminal 10 prints the rating labels based on this rating label printing data.

Figure 7:
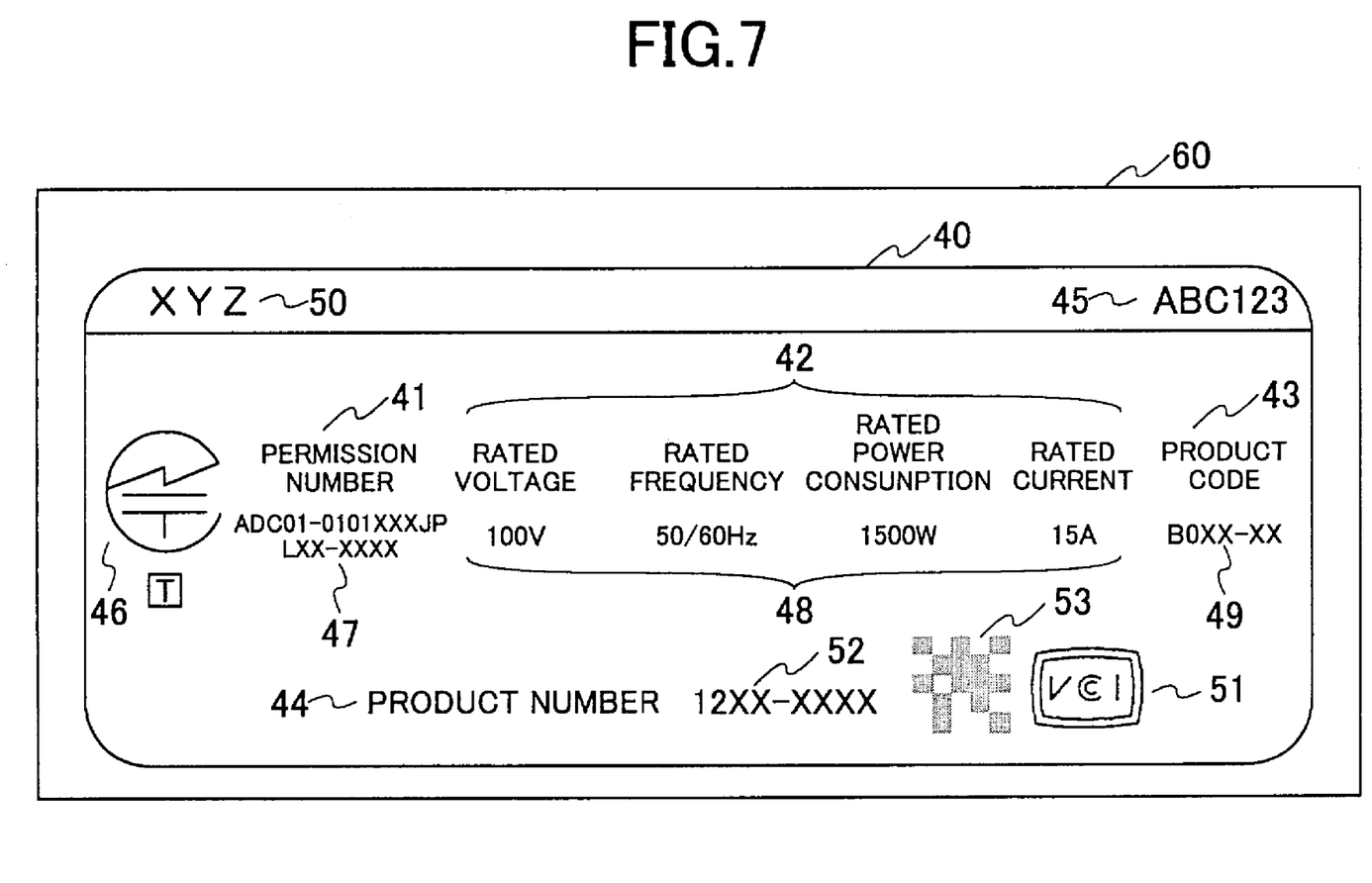
FIG. 7 is an illustration showing the rating label.

As a result of this, as shown in FIG. 7, a label sheet 60 in which each item is set on the rating label format 40 is printed. As for the manufactured product number display 52, the product numbers assigned to the respective label sheets 60 are set as the manufactured product number displays 52. The two-dimensional bar code display 53 includes information such as the product number, the product type identifier, and the manufacture data of the product. Thus, the two-dimensional bar code display includes the information of the product number, so that the different two-dimensional bar codes that correspond to respective manufactured product numbers 52 are set for the respective rating labels to be manufactured. Then, an operator may attach the thus-manufactured rating labels to the manufactured products, respectively.

As described above, according to the embodiment of the present invention, the following advantages are obtained.

In the above-described embodiment, based on the product type a2 specified by the product type identifier b1 and based on the shipment destination identifier a1, the management computer 21 obtains the record items a4 to be recorded on the rating label. Thus, the contents to be shown on the rating label can be determined from the product-type and the shipment destination.

Furthermore, according to the above-described embodiment, based on the permission information b2 and the rating information b3 of the product type data 230, the management computer 21 determines the contents to be printed on the rating label. Accordingly, it is possible to efficiently set the layout of the rating label.

Further, according to the above-described embodiment, when the management computer 21 receives from the rating label output terminal 10 the manufacturing request that the rating label should be manufactured, based on the shipment destination specification data 220, the product type data 230, and so on, the management computer 21 determines the contents to be printed on the rating label. That is, the rating labels can be printed on the condition that before the rating label output terminal 10 sends the manufacturing request to the management computer 21, the record items a4 corresponding to the permission type a3 of the obtained permission, and the rating label format are determined. Accordingly, in a case where before sending the manufacturing request to the management computer 21, the permission is obtained, the rating label on which the permission mark and the permission type identifier are recorded can be manufactured. For example, in the case of manufacturing the rating label in response to the completion of the product, it is possible to manufacture the rating label having the information of the permission that has been obtained at the time of the completion of the product.

In addition, according to the above-described embodiment, the two-dimensional bar code display 53 that has the information about the manufactured product number is printed on the rating label. Accordingly, the work based on the information of the rating label can be efficiently performed. For example, this is because the management computer automatically manages the manufactured product number by using the two-dimensional bar code.

In the above-described embodiment, before the manufacturing request is sent to the management computer 21, the product type data 230 is input in advance by an operator so that the product type data can be used for manufacturing the rating label. On the other hand, according to an alternative embodiment of the present invention, at the time the rating label output terminal 10 sends to the management computer 21 the manufacturing request that the rating label should be manufactured, the rating label output terminal 10 prompts an operator to input the rating information and the information about whether or not the permission has been obtained. For example, when the manufacturing request that the rating label should be manufactured is sent to the management computer 21, the management computer 21 causes the rating label output terminal 10 to display on the monitor of the rating label output terminal the information of whether or not the permission has been obtained and the input image for inputting the rating information by the operator. Then, the operator may input the rating information, the permission information and/or the like to the management computer 21 from the rating label output terminal 10. In this manner, the operator can input the permission type, the record items necessary for the rating label without omission.

In the above-described embodiment, an operator attaches the manufactured rating labels to the manufactured products, respectively. Meanwhile, according to an alternative embodiment of the present invention, the rating labels may be manufactured at the same manufacturing line as the line of the products. In this manner or a different manner, the manufactured rating labels may be automatically attached to the products, respectively. In these manners, it is possible to improve efficiency in manufacturing the rating labels and attaching the rating labels to the products.

In the above-described embodiment, the format of the rating label is determined in advance by the rating label format a5 of the shipment destination specification data 220. Accordingly, whether or not the permission has been obtained, the rating labels are manufactured by using the same format. However, according to an alternative embodiment, the format of the rating label may be changed depending on whether or not the permission has been obtained. For example, when the permission of the permission type a3 has not been obtained, the sizes and intervals of characters and illustrations to be printed on the rating label may be adjusted such that the rating information title 42 and the rating information display 48 are recorded at the positions of the permission mark display 46 and the permission number display 47.

In the above-described embodiment, the storing units 22 and 23 are provided at the rating label manufacturing system 20. However, according to an alternative embodiment of the present invention, the storing units 22 and 23 may be provided at another position such that the positions of the storing units 22 and 23 are different from each other. In this case, the same above-described processes may be performed by using the machines where the storing units 22 and 23 are provided.

As described above, according to the present invention, it is possible to efficiently manufacture the rating labels having the necessary permission mark and rating information.

This patent application is based on Japanese priority patent application No. 2002-133918 filed on May 9, 2002, the entire contents of which are hereby incorporated by reference.

What is claimed is:

1. A method of manufacturing a rating label by using shipment destination specification information storing means and a computer that controls the shipment destination specification information storing means, in which the shipment destination specification information storing means stores permission types and rating label record items that are determined in accordance with respective shipment destinations and respective product types, the method comprising the steps of:
    specifying a first product type based on a product type identifier input to the computer;
    extracting a first permission type and one or more rating label record items from the shipment destination specification information storing means based on a first shipment destination of a first product input to the computer and based on the first product type; and
    setting a first layout of a first rating label based on the first permission type and the one or more rating label record items that are to be shown on the first rating label.

2. The method according to claim 1, wherein the step of setting comprises the steps of:
    based on the first permission type and the one or more rating label record items, prompting an operator to input information of whether or not permission about the first permission type has been obtained, and prompting an operator to input contents of the one or more rating label record items; and
    setting the first layout of the first rating label based on input information of whether or not the permission about the first permission type has been obtained and based on the input contents of the one or more rating label record items.

3. The method according to claim 1, wherein the computer is connected to product type information storing means that stores product type information including permission information and rating information for each product type identifier,
    and the step of setting comprises the steps of:
    extracting from the product type information storing means product type information related to the first permission type and the one or more rating label record items; and
    setting the first layout of the first rating label based on the extracted product type information.

4. The method according to claim 3, wherein the step of setting the first layout comprises the step of generating a rating label format based on rating label format information stored in the shipment destination specification information storing means so that the first rating label can be manufactured by using the rating label format.

5. The method according to claim 4, wherein the step of setting the first layout further comprises the step of setting the extracted rating information on the rating label format.

6. The method according to claim 5, further comprising the step of transmitting the generated rating label format to a terminal where the first rating label is actually manufactured.

7. The method according to claim 1, further comprising the steps of:
    at the computer, receiving a necessary number of the rating labels on which the first permission type and the one or more rating label record items are recorded; and
    determining a start number of product numbers assigned to the rating labels, respectively, based on a maximum product number that has already been assigned.

8. A computer readable medium having a program for causing a computer to execute a method of manufacturing a rating label, in which the computers controls shipment destination specification information storing means that store permission types and rating label record items determined in accordance with respective shipment destinations and respective product types, the program comprising:
    a product type specifying code for specifying a first product type based on a product type identifier input to the computer;
    a rating label record item extracting code for extracting a first permission type and one or more rating label record items from the shipment destination specification information storing means based on a first shipment destination of a first product input to the computer and based on the first product type; and
    a rating label layout setting code for setting a first layout of a first rating label based on the first permission type and the one or more rating label record items that are to be shown on the first rating label.

9. The program according to claim 8, wherein the rating label layout setting code comprises:
    a code for based on the first permission type and the one or more rating label record items, prompting an operator to input information of whether or not permission about the first permission type has been obtained, and prompting an operator to input contents of the one or more rating label record items; and
    a code for setting the first layout of the first rating label based on the input information of whether or not the permission about the first permission type has been obtained and based on the input contents of the one or more rating label record items.

10. The program according to claim 8, wherein the computer is connected to product type information storing means that store product type information including permission information and rating information for each product type identifier,
    and the rating label layout setting code comprises:
    a code for extracting from the product type information storing means product type information related to the first permission type and the one or more rating label record items; and
    a code for setting the first layout of the first rating label based on the extracted product type information.

11. The program according to claim 10, wherein the rating label layout setting code comprises a code for generating a rating label format based on rating label format information stored in the shipment destination specification information storing means so that the first rating label can be manufactured by using the rating label format.

12. The program according to claim 11, wherein the code for generating comprises a code for setting the extracted rating information on the rating label format.

13. The program according to claim 12, further comprising a code for transmitting the generated rating label format to a terminal where the first rating label is actually manufactured.

14. The program according to claim 8, further comprising:
    a code for receiving a necessary number of the rating labels on which the first permission type and the one or more rating label record items are recorded; and code for determining a start number of product numbers assigned to the rating labels, respectively, based on a maximum product number that has already been assigned.

15. A management computer for manufacturing a rating label by using a shipment destination specification information storing unit that stores permission types and rating label record items that are determined in accordance with respective shipment destinations and respective product types, the management computer comprising:

a first part for specifying a first product type based on a product type identifier input to the management computer;

a second part for extracting a first permission type and one or more rating label record items from the shipment destination specification information storing unit based on a first shipment destination of a first product input to the computer and based on the first product type; and a third part for generating a first rating label format based on rating label format information stored in the shipment destination specification information storing unit so that the first rating label can be manufactured by using the first rating label format on which the first permission type and the one or more rating label record items are shown.

* * * * *